United States Patent
Huang et al.

(10) Patent No.: US 10,186,967 B2
(45) Date of Patent: Jan. 22, 2019

(54) SWITCHING CONVERTER WITH RAMP-BASED OUTPUT REGULATION

(71) Applicant: Powerventure Semiconductor Limited, London (GB)

(72) Inventors: Chi-Chia Huang, Hsinchu (TW); Yuan-Wen Hsiao, Hsinchu (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/195,991

(22) Filed: Jun. 28, 2016

(65) Prior Publication Data
US 2017/0373595 A1 Dec. 28, 2017

(51) Int. Cl.
  *H02M 3/158* (2006.01)
  *H02M 3/157* (2006.01)
  *H02M 1/00* (2006.01)

(52) U.S. Cl.
  CPC .......... *H02M 3/158* (2013.01); *H02M 3/157* (2013.01); *H02M 3/1582* (2013.01); *H02M 3/1584* (2013.01); *H02M 3/1588* (2013.01); *H02M 2001/0025* (2013.01); *H02M 2001/0032* (2013.01)

(58) Field of Classification Search
  CPC ................ H02M 3/156; H02M 3/158; H02M 2001/0025
  USPC ....................................................... 323/288
  See application file for complete search history.

(56) References Cited

U.S. PATENT DOCUMENTS

| | | | |
|---|---|---|---|
| 8,395,367 B2* | 3/2013 | Chien | H02M 3/1588 323/288 |
| 2011/0273156 A1 | 11/2011 | Miyamae | |
| 2012/0043949 A1 | 2/2012 | Nakamura | |
| 2014/0132236 A1 | 5/2014 | Darmawaskita et al. | |
| 2015/0311798 A1 | 10/2015 | Yuan et al. | |
| 2017/0077812 A1* | 3/2017 | Guo | H02M 3/158 |

FOREIGN PATENT DOCUMENTS

CN 101964662 2/2011

OTHER PUBLICATIONS

"Designing a Dynamic Ramp With an Invariant Inductor in Current-Mode Control for an On-Chip Buck Converter," by Wen-Wei Chen et al., IEEE Transactions on Power Electronics, vol. 29, No. 2, Feb. 2014, pp. 750-758.
"A Ripple-Based Constant On-Time Control With Virtual Inductor Current and Offset Cancellation for DC Power Converters," by Yu-Cheng Lin et al., IEEE Transactions on Power Electronics, vol. 27, No. 10, Oct. 2012, pp. 4301-4310.

(Continued)

*Primary Examiner* — Gary L Laxton
*Assistant Examiner* — Rafael O. De León Domenech
(74) *Attorney, Agent, or Firm* — Saile Ackerman LLC; Stephen B. Ackerman

(57) ABSTRACT

A switching converter comprising a regulation circuit adapted to regulate an output value of the converter based on a ramp signal is provided. A feedback circuit adapted to control at least one of a delay and a slope of the ramp signal based on a parameter of the ramp signal is also provided. A method of regulating an output value of a switching converter is also presented.

13 Claims, 9 Drawing Sheets

(56) References Cited

OTHER PUBLICATIONS

"Adaptive Ripple-Based Constant On-Time Control wtih Internal Ramp Compensations for Buck Converters," by Kuang-Yao (Brian) Cheng et al., 2014 IEEE Applied Power Electronics Conference and Exposition—APEC 2014, Mar. 16-20, 2014, pp. 440-446.

"A novel current mode buck regulator with fast transient response using derivative ripple voltage in 180nm," by Sreehari Rao Patri et al., International Journal of Recent Trends in Engineering, vol. 2, No. 5, Nov. 2009, pp. 85-90.

"Quadratic Differential and Integration Technique in $V^{\wedge}2$ Control Buck Converter With Small ESR Capacitor," by Yu-Huei Lee et al., IEEE Transactions on Power Electronics, vol. 25, No. 4, Apr. 2010, pp. 829-838.

"Subharmonic Analysis for Buck Converters With Constant On-Time Control and Ramp Compensation," by Ting Qian, IEEE Transactions on Industrial Electronics, vol. 60, No. 5, May 2013, pp. 1780-1786.

"Transient Response versus Ripple—An Analysis of Ripple Injection Techniques Used in Hysteretic Controllers," by Dilip Mohol et al., Texas Instruments, Application Report, SLVA653—Apr. 2014, 15 pgs.

"Adaptive Constant On-Time (D-CAP$^{\wedge}$TM) Control Study in Notebook Applications," by Chuan Ni et al., Texas Instruments, Application Report, SLVA281B—Jul. 2007—Revised Dec. 2007, 9 pgs.

"Single-Phase, D-CAP$^{\wedge}$TM and D-CAP$^{\wedge}$2TM Controller with 2-Bit Flexible VID Control," Texas Instruments, TPS51518, SLUSA08—Dec. 2011, 35 pgs.

"LM5037 Dual-Mode PWM Controller With Alternating Outputs," Texas Instruments, LM5037, SNVS578D—Nov. 2008—Revised May 2015,40 pgs.

"CPU Power Solution with Green-Native Adaptive Voltage Positioning (G-NAVP$^{\wedge}$TM) Topology," Richtek Technology Corporation, Application Note, by Wayne Chen, AN020—Jul. 2014, pp. 1-11.

* cited by examiner

SWITCHING CONVERTER WITH RAMP-BASED OUTPUT REGULATION

TECHNICAL FIELD

The present disclosure relates to an apparatus and methods for regulating an output of a switching converter. In particular, the present disclosure relates to regulating an output of a constant on-time switching converter.

BACKGROUND

Constant-on-time (COT) switching converters are commonly used in the field of power supplies.

However, when operating under light load conditions, current COT switching converters tend to display a poor quality of response characterised by high jitter and large output voltage variations. This limits their usability, especially for applications in which the output load may be expected to vary across many orders of magnitude.

SUMMARY

It is an object of the disclosure to address one or more of the above mentioned limitations.

According to a first aspect of the disclosure, there is provided a switching converter comprising a regulation circuit adapted to regulate an output value of the converter based on a ramp signal; and a feedback circuit adapted to control at least one of a delay and a slope of the ramp signal based on a parameter of the ramp signal.

Optionally, the parameter of the ramp signal comprises an amplitude of the ramp signal.

Optionally, the parameter of the ramp signal comprises a time duration during which the ramp signal is turned on.

Optionally, the switching converter comprises a ramp generator.

Optionally, the ramp generator comprises a capacitor circuit and a delay circuit coupled to a comparator; wherein the comparator is adapted to compare an output of the delay circuit with a reference value; and wherein the capacitor circuit is adapted to receive an output of the comparator.

Optionally, the feedback circuit comprises a controller coupled to the ramp generator, the controller being adapted to output a control signal based on the parameter of the ramp signal; and wherein the ramp generator is adapted to receive the control signal and to alter the at least one of a delay and a slope of the ramp signal based on the control signal.

Optionally, the controller comprises a comparator adapted to compare the parameter associated with the ramp signal with a reference value and to output the control signal based on the comparison.

Optionally, the comparator comprises at least one of an operational amplifier and a digital subtractor coupled to a digital to analog converter.

Optionally, the controller comprises a first circuit adapted to detect a time duration during which the ramp signal is turned on.

Optionally, the first circuit comprises a current generator coupled to a capacitor and a switch connected in parallel with the capacitor; wherein the switch is adapted to receive a control signal.

Optionally, the first circuit comprises a counter.

Optionally, the controller comprises a second circuit adapted to detect an amplitude of the ramp signal.

Optionally, the second circuit comprises at least one of a sample-and-hold circuit and a low-pass filter.

According to a second aspect of the disclosure, there is provided a method of regulating an output value of a switching converter comprising generating a ramp signal to regulate an output of the converter; detecting a parameter associated with the ramp signal; controlling at least one of a delay and a slope of the ramp signal based on the parameter.

Optionally, the parameter associated with the ramp signal comprises at least one of an amplitude of the ramp and a time duration during which the ramp signal is turned on.

Optionally, controlling at least one of a delay and a slope of the ramp signal comprises comparing the parameter associated with the ramp signal with a reference value and generating a control signal based on the comparison.

Optionally, the control signal is adapted to increase a delay of the ramp signal upon identifying that the parameter of the ramp signal is greater than a reference value and to decrease a delay of the ramp signal upon identifying that the parameter is smaller than a reference value.

Optionally, the control signal is adapted to increase a slope of the ramp signal upon identifying that the parameter of the ramp signal is smaller than a reference value and to decrease a slope of the ramp signal upon identifying that the parameter of the ramp signal is greater than a reference value.

BRIEF DESCRIPTION OF THE DRAWINGS

The disclosure is described in further detail below by way of example and with reference to the accompanying drawings, in which.

DESCRIPTION

Figure 1:
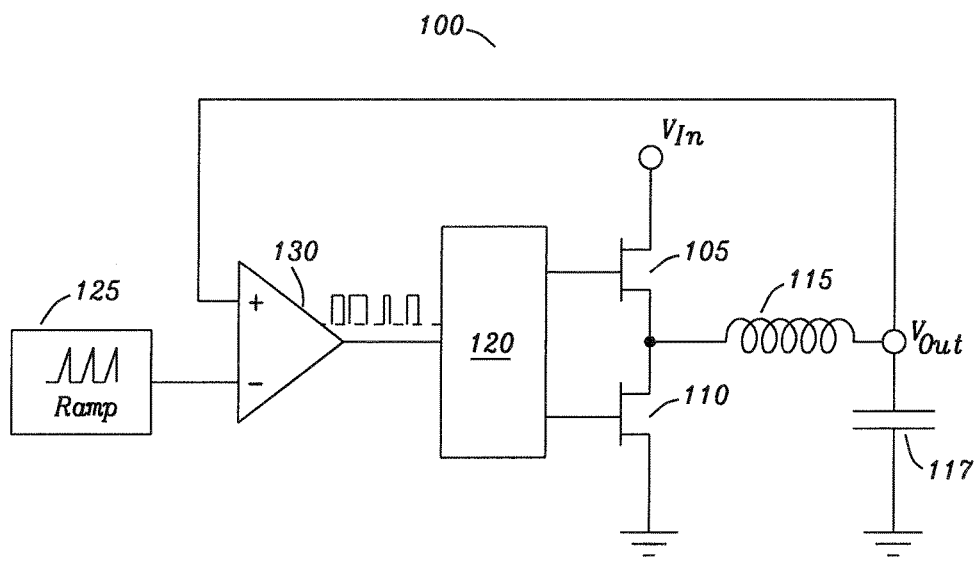
FIG. 1 is a diagram of a constant on-time switching converter.

FIG. 1 illustrates a constant on-time switching converter 100. The converter includes a high side power switch 105, a low side power switch 110, an inductor 115, a gate driver 120, and an output regulation loop for regulating an output voltage of the converter. The output regulation loop includes a ramp generator 125 and a Pulse Width Modulation PWM comparator 130. The Pulse Width Modulation PWM comparator 130 has a first (for example non-inverting) input for receiving an output voltage Vout of the converter, a second (for example inverting) input for receiving a ramp Voltage Vramp, and one output coupled to the gate driver 120. In operation, when Vout is lower than Vramp, the comparator 130 sends a logic low to the gate driver 120. The gate driver 120 then turns on the high side switch 105 for a fixed duration D*T, where D is the duty cycle and T is the switching period, hence the name "constant on-time switching converter". When that fixed duration expires, gate driver 120 turns off the switch 105 and turns on the switch 110. The output voltage is regulated to be D*Vin, where Vin is the supply voltage.

Figure 2:
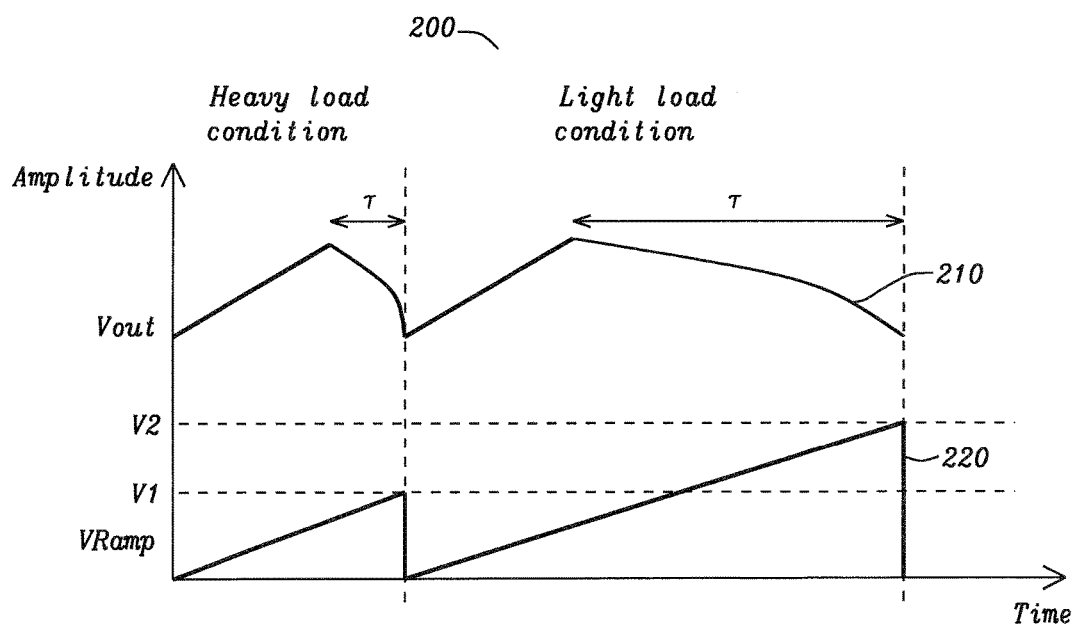
FIG. 2 is a timing chart illustrating the working of the converter of FIG. 1.

FIG. 2 shows the waveforms of the output voltage Vout 210 and the ramp voltage Vramp 220 of the converter of FIG. 1. In a switching converter, the output voltage Vout experiences amplitude variations between a minimum and a maximum voltage, sometimes referred to as ripples. The characteristic of these ripples may depend of a variety of parameters. In particular, a time duration it takes for Vout to decrease from its maximum to its minimum value, referred to as discharge time τ, varies as a function of the load applied to the output of the converter. When the converter is operating under heavy load conditions, Vout takes a relatively short time to return to its minimum value. In contrast, when the converter is operating under light load conditions, Vout takes a relatively long time to return to its minimum value. As a consequence, the switching period T of the converter increases. Depending on the load difference experienced by the converter, the switching period may increase by one or two orders of magnitudes.

Considering for example a ramp having a fixed slope of 60 mV/2 µs, and a Vout discharge time under light load condition of 200 us, the ramp voltage Vramp will increase to a value V2 of 6V in each cycle. This voltage value is greater than the voltage V1 obtained in heavy load condition. If the power rail is 5V, then the ramp will saturate, therefore affecting operation of the feedback circuit. If the output load is increased, this will also cause a large variation of the output voltage Vout, hence causing potential malfunctioning of the circuit.

Figure 3:
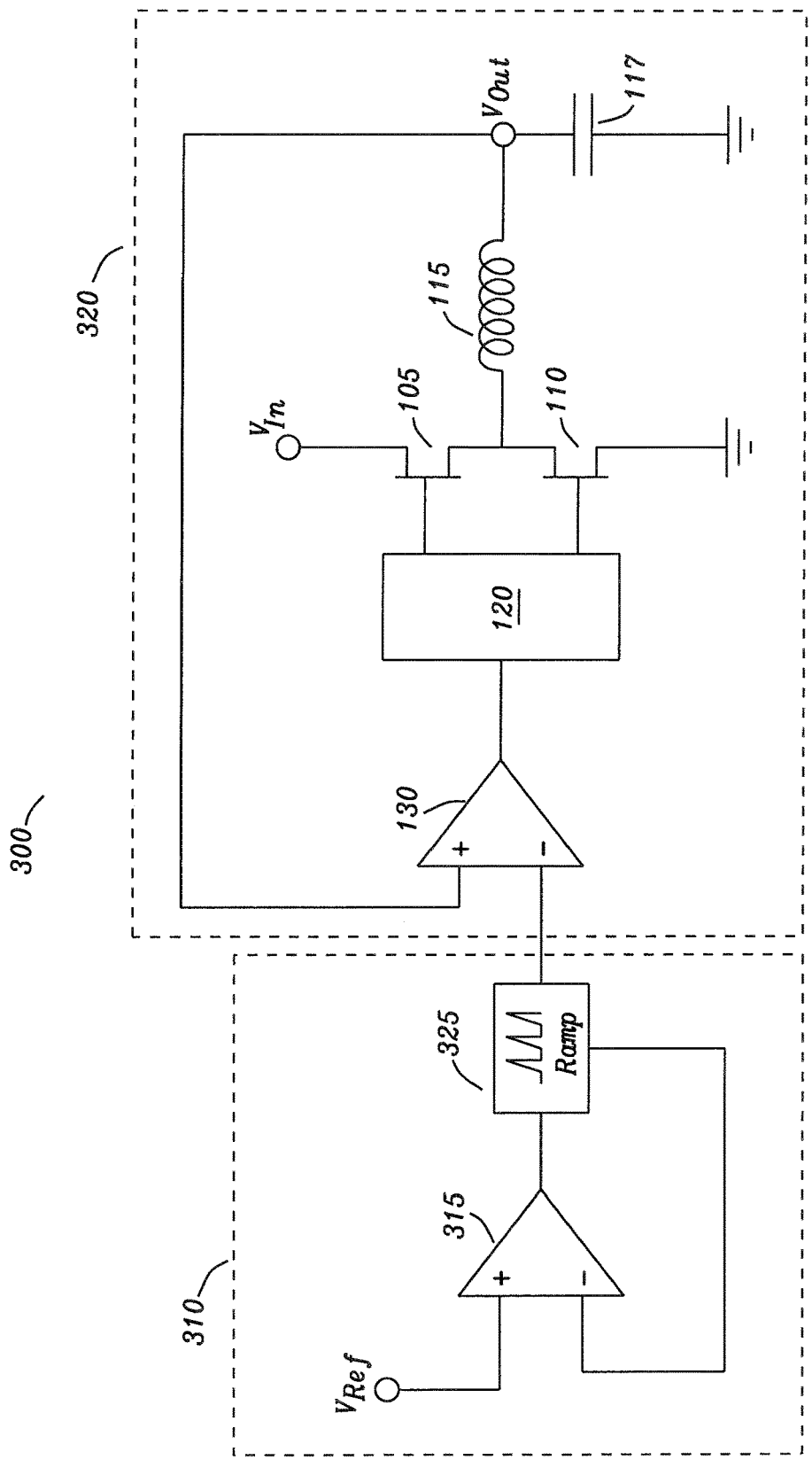
FIG. 3 is a diagram of a constant on-time switching converter according to an exemplary embodiment of the present disclosure.

FIG. 3 illustrates a constant on-time switching converter 300 according to an exemplary embodiment of the present disclosure. In addition to the switching converter circuit of FIG. 1, the circuit of FIG. 3 incorporates a feedback loop 310 for controlling the ramp signal generated by the ramp generator 325. The feedback loop includes a controller, for example a comparator 315 connected to the ramp generator 325. The comparator 315 has a first (for example non-inverting) input for receiving a reference value, a second (for example inverting) input for receiving a ramp parameter value and an output for outputting a control signal to the ramp generator 325. The ramp parameter value may be an amplitude value of the ramp signal such as a voltage value. Alternatively, the ramp parameter value may be a time duration such as an ON-width of the ramp signal corresponding to a time duration during which the ramp is turned on. The control signal may be an electrical parameter value, for example a current value Itune.

Figure 4:
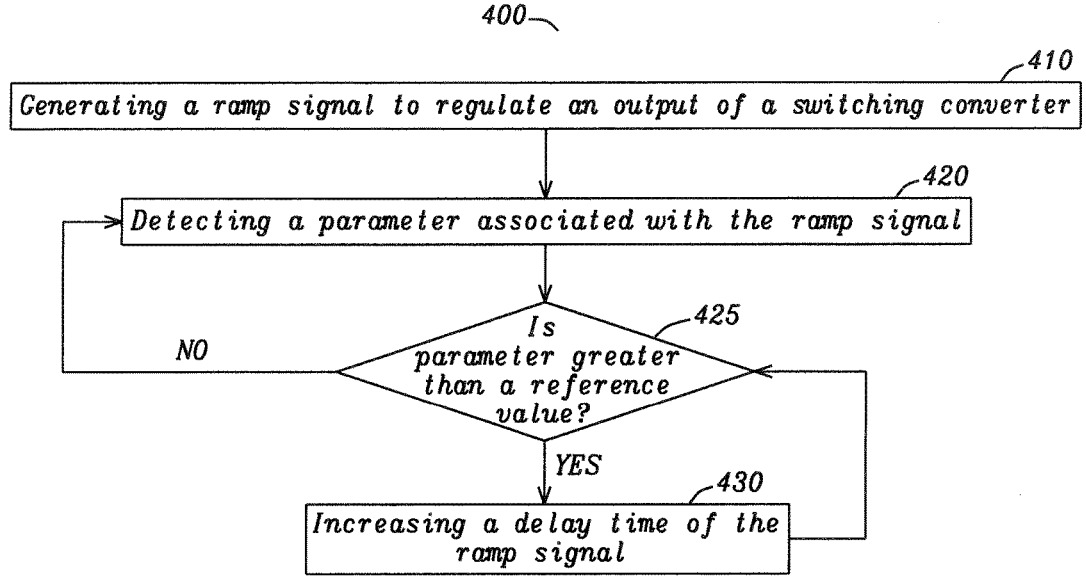
FIG. 4 is a flow diagram of a method of regulating an output of a switching converter.

FIG. 4 is a flow diagram of a method for regulating an output value of a switching converter using the circuit of FIG. 3. At step 410, the generator 325 generates a ramp signal to regulate an output of the converter. For example, the ramp signal is used to regulate the output voltage Vout via the comparator 130 and the gate driver 120. At step 420 a parameter associated with the ramp signal is detected. For example, the parameter associated with the ramp signal may be an amplitude or an ON-width of the ramp signal. At step 430 a delay and or a slope of the ramp signal is adjusted based on the parameter. For example, the parameter can be compared 425 with a reference value and a control signal generated based on the comparison. In a specific example the ramp voltage is compared with a reference voltage using a comparator which output a current, the amplitude of which is a function of a difference between the ramp voltage and the reference voltage. The control signal can then be used to adjust the delay of the ramp signal. For example, the control signal may be adapted to increase the delay of the ramp signal.

Figure 5:
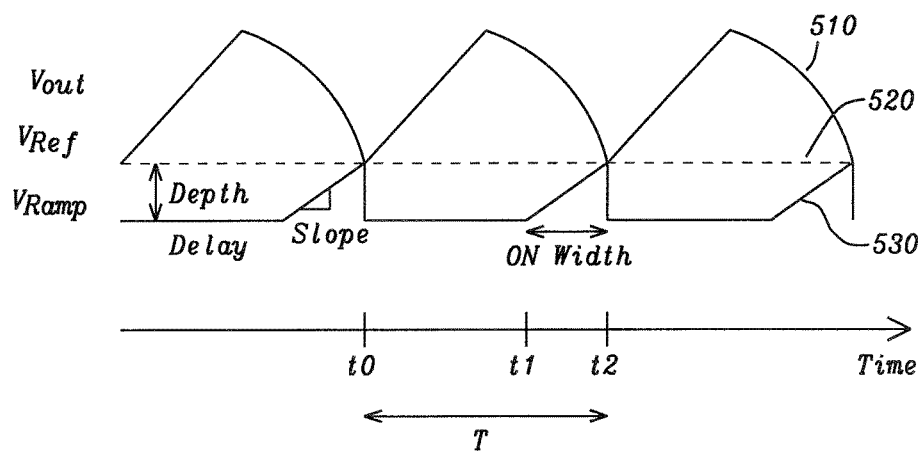
FIG. 5 is a timing chart illustrating the working of the converter of FIG. 3.

FIG. 5 is a timing chart illustrating the waveforms of the output voltage Vout 510, the reference voltage Vref 520, and the ramp voltage Vramp 530. The waveforms are represented over three switching cycles of switching period T. When at time t0, the output voltage Vout of the converter drops below the ramp voltage Vramp, the high-side switch 105 of the converter turns on to start a new cycle at which point Vout starts increasing. The ramp voltage 530 remains constant for a certain time duration after the start of a new cycle before it starts increasing at time t1. This time duration also referred to as delay can be adjusted in order to obtain a desired ramp voltage at a certain point in time. The ramp voltage increases between the time t1 and t2. This time duration (t2–t1) is referred to as the ON-width of the ramp, during which the ramp is turned on. Reverting to our previous example, in which under light load condition Vout takes 200 µs to discharge, it is possible to delay the ramp by 198 µs. In this way, the ramp amplitude reaches the value 60 mV above its DC value in each cycle.

The ramp voltage obtained at a certain point in time may also be varied by adjusting the slope of the ramp signal. However, varying the slope of the ramp signal may lead to instability of the converter. The stability criteria of COT converters are discussed in publication titled: "A ripple-based constant on-time control with virtual inductor current and offset cancellation for DC power converters", IEEE Transactions on Power Electronics (Volume: 27, Issue: 10), pages: 4301-4310. A low value of the ramp slope may also render the converter sensitive to noise.

Figure 6:
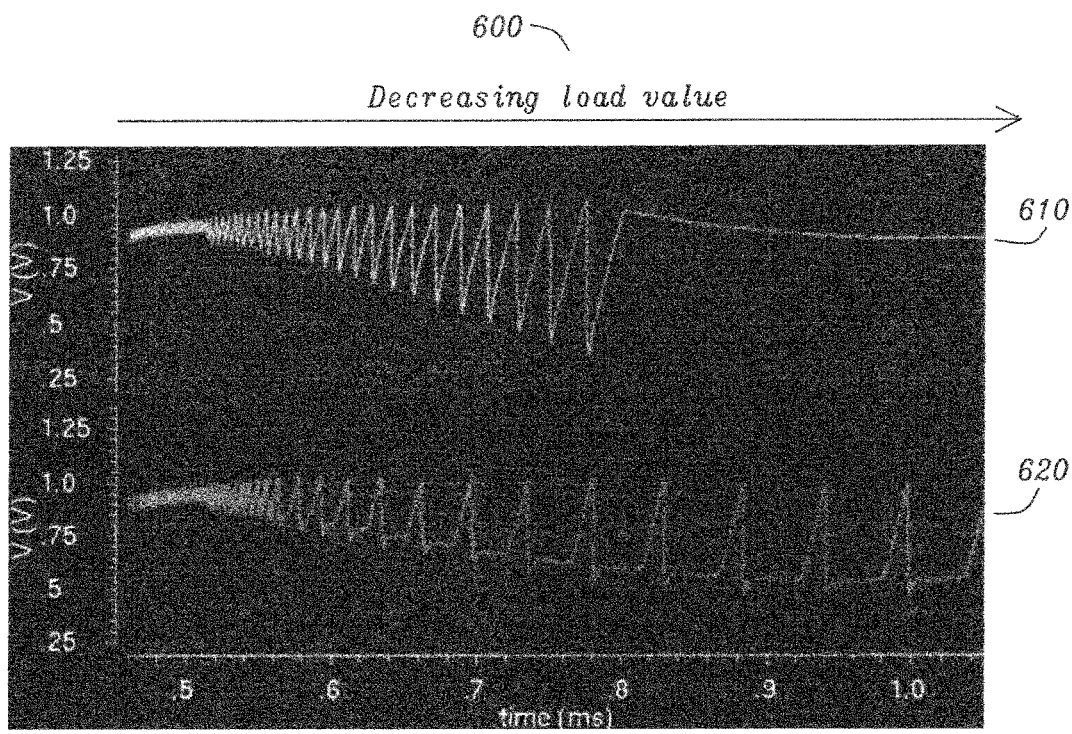
FIG. 6 is a representation of a fix ramp and a dynamic ramp signal as a function of a decreasing load.

FIG. 6 shows two ramp signals obtained as a function of a decreasing load value. The top ramp signal 610 corresponds to a ramp having a fixed slope and a fixed delay of about 400 ns. As the load decreases, the switching period increases and the amplitude of the fixed ramp keeps increasing until it saturates. In this case the output regulation loop would fail to regulate the output voltage. The bottom signal 620 corresponds to a dynamic ramp having a tunable delay as described above. When the switching period is increased, the feedback loop increases the delay of the dynamic ramp, hence preventing saturation and maintaining proper operation of the output regulation loop.

Figure 7:
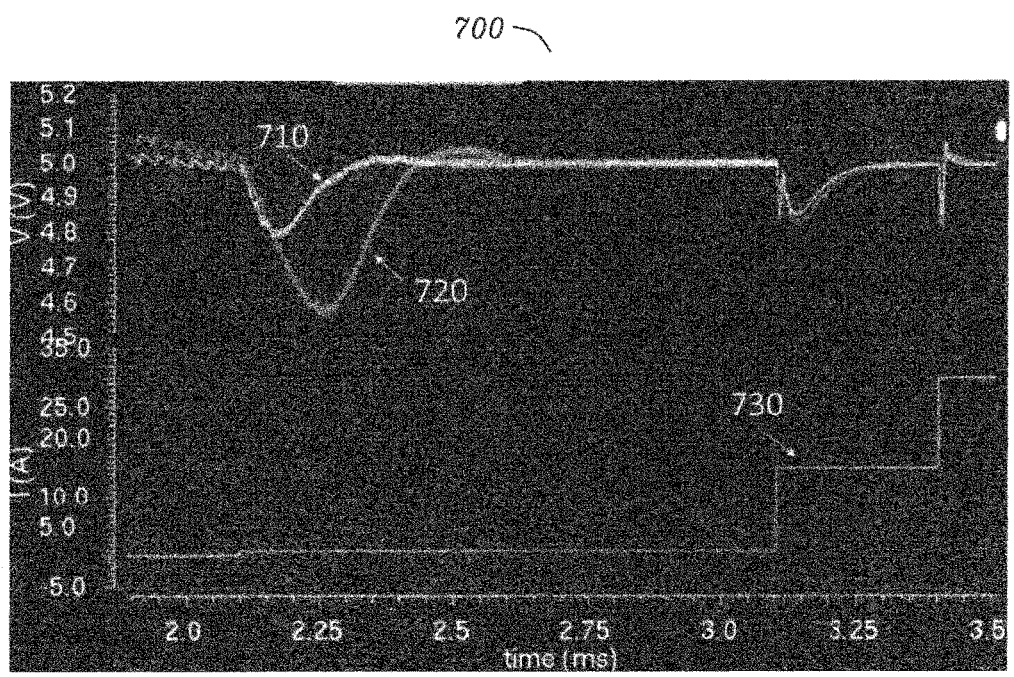
FIG. 7 is a representation of two output response curves as a function of an increasing load, obtained with a fixed ramp and a dynamic ramp respectively.

FIG. 7 shows two voltage output response curves 710 and 720 obtained with a dynamic ramp and a fixed ramp respectively. The curves 710 and 720 are plotted for different loads illustrated by the output load current profile 730. The load current profile 730 has three steps: a first step corresponding to a load value of 1 Amp, a second step corresponding to a load value of 15 Amps and a third step corresponding to a load value of 30 Amps. It can be observed that at low load value, a small step change results in a large voltage variation. Such variations, also referred to as overshoot or undershoot may lead to system malfunctions. It can be observed that the voltage variation of the fixed response curve 720 is larger than the voltage variation of the dynamic response curve 710. In other words, a circuit provided with dynamic ramp reduces the negative impact due to output overshoots and undershoots.

Figure 8:
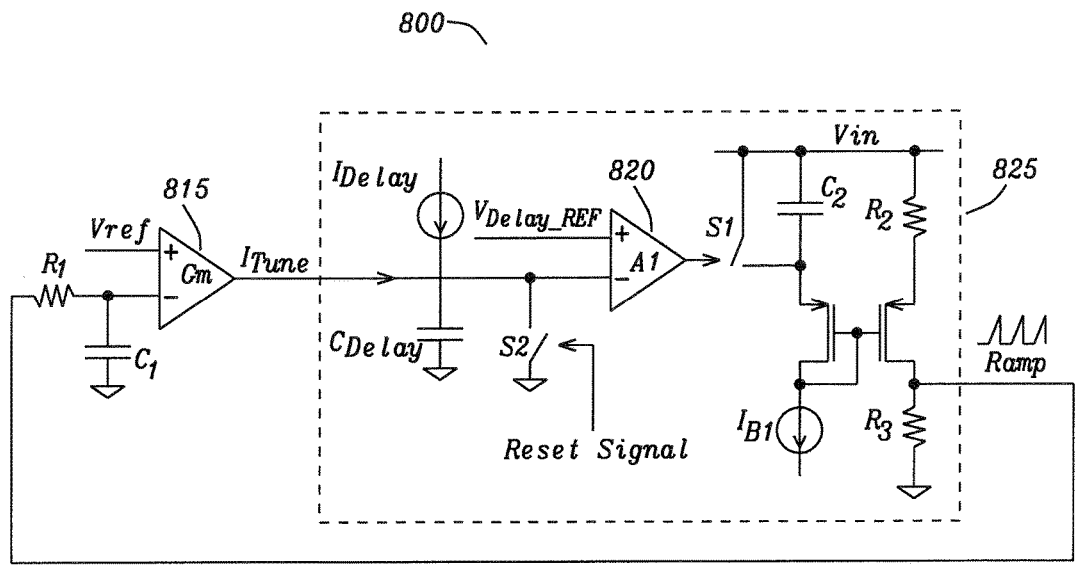
FIG. 8 is a diagram of a feedback loop for the switching converter of FIG. 3 based on an amplitude of a ramp signal.

FIG. 8 shows an example feedback circuit 800 for adjusting a delay of a ramp signal based on an amplitude of the ramp signal. The circuit 800 includes a ramp generator 825 having an input connected to a controlling circuit, and an output for outputting a ramp signal.

The ramp generator 825 has a delay cell for determining the ramp delay; a comparator 820 having a first input, a second input and an output; and capacitor charging circuit having an input and an output. The delay cell comprises a current generator for generating delay current Idelay with a fixed value; and a capacitor Cdelay. A switch S2 is connected in parallel across Cdelay. The switch S2 is adapted to receive a reset signal to control the discharge of Cdelay. The first input of the comparator 820 is connected to the output voltage of the delay cell, and the second input of the comparator 820 is connected to a voltage reference Vdelay-ref. The output of the comparator 820 is a logic signal for controlling operation of the capacitor circuit. The capacitor circuit includes a capacitor C2 coupled to a switch S1 and a voltage to current converter, such as a current mirror arrangement. The switch S1 is provided across the capacitor C2, and adapted to receive the logic signal from the comparator 820. The current mirror arrangement may be provided by a first transistor connected to a second transistor. In FIG. 8, the first and second transistors are connected such that a gate of the first transistor is connected to a gate of the second transistor. A source of the first transistor is connected to a terminal of the capacitor C2 and a source of the second transistor is connected to a resistor R2. A drain of the second transistor is connected to a resistor R3. In this arrangement, the first and second transistors act as a voltage to current converter that converts the voltage across C2 into a current I. The ramp signal corresponds to a voltage (V=I×R3) across the resistor R3.

In this example, the controlling circuit is formed by an amplifier 815 that includes a non-inverting input connected to a reference voltage Vref and an inverting input connected to a low pass filter provided by a resistance R1 and a capacitor C1. In an exemplary embodiment the amplifier 815 may be provided by an operational transconductor amplifier, such as a Gm cell. The ramp signal is connected to the low pass filter for filtering out the high frequencies of the ramp signal.

Upon injection of the fixed delay current $I_{Delay}$ into the capacitor $C_{Delay}$, the ramp generator 825 generates a ramp signal having a fixed delay duration. When a tunable current $I_{Tune}$, generated by the amplifier 815, is injected into the ramp generator 825, Itune changes the time required for Cdelay to be charged from ground to Vdelay-ref. This changes a time duration during which the switch S1 is closed, hence changing the delay of the ramp signal. The capacitor Cdelay is discharged after each cycle via the reset signal.

Figure 9:
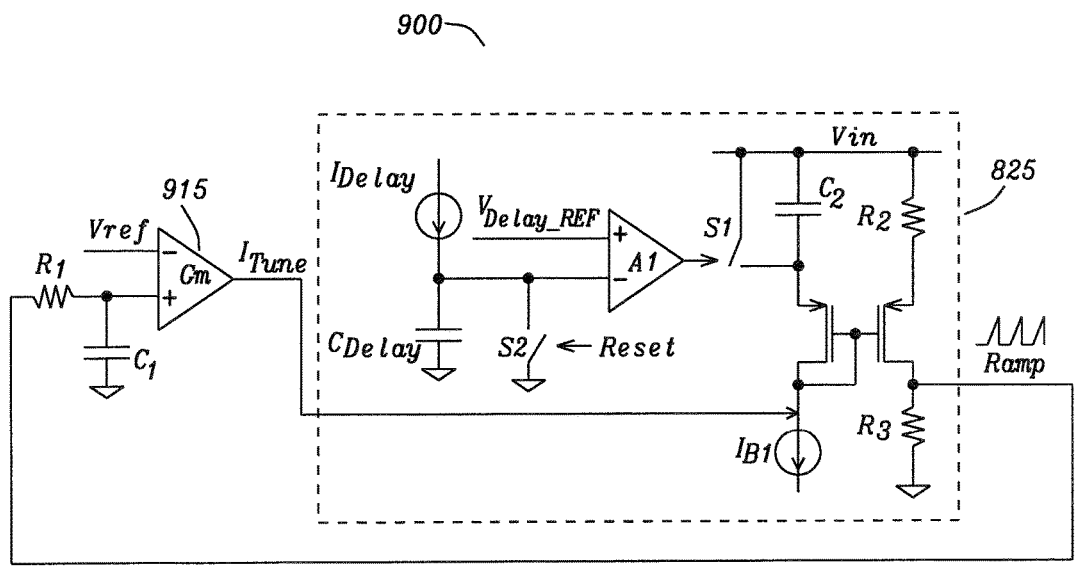
FIG. 9 is a diagram of an alternative feedback loop for the switching converter of FIG. 3 based on an amplitude of a ramp signal.

FIG. 9 shows an example feedback circuit 900 for adjusting a slope of a ramp signal based on an amplitude of the ramp signal. The circuit 900 includes a ramp generator having an input connected to a controlling circuit, and an output for outputting a ramp signal. The ramp generator may be the same as the ramp generator 825 described with respect to FIG. 8.

The controlling circuit is formed by an amplifier 915 that includes an inverting input connected to a reference voltage Vref and a non-inverting input connected to a low pass filter provided by a resistance R1 and a capacitor C1. In an exemplary embodiment the amplifier 915 may be provided by an operational transconductor amplifier, such as a Gm cell. The ramp signal is connected to the low pass filter for filtering out the high frequencies of the ramp signal. The output of the amplifier 915 is connected to a drain of the first transistor of the ramp generator 825.

In operation, the tuning current Itune generated by the amplifier 915, is combined with the fixed current IB1 such that the current charging C2 is IB1-Itune. When Itune increases, the current charging C2 decreases and thus decreases the slope of the ramping voltage across C2 when S1 is open. This ramping voltage with decreased slope is converted to the ramp current I and thus decreases the slope of the ramp signal.

The circuits of FIGS. 8 and 9 may be combined to permit adjusting both the delay and the slope of the ramp signal.

Figure 10:
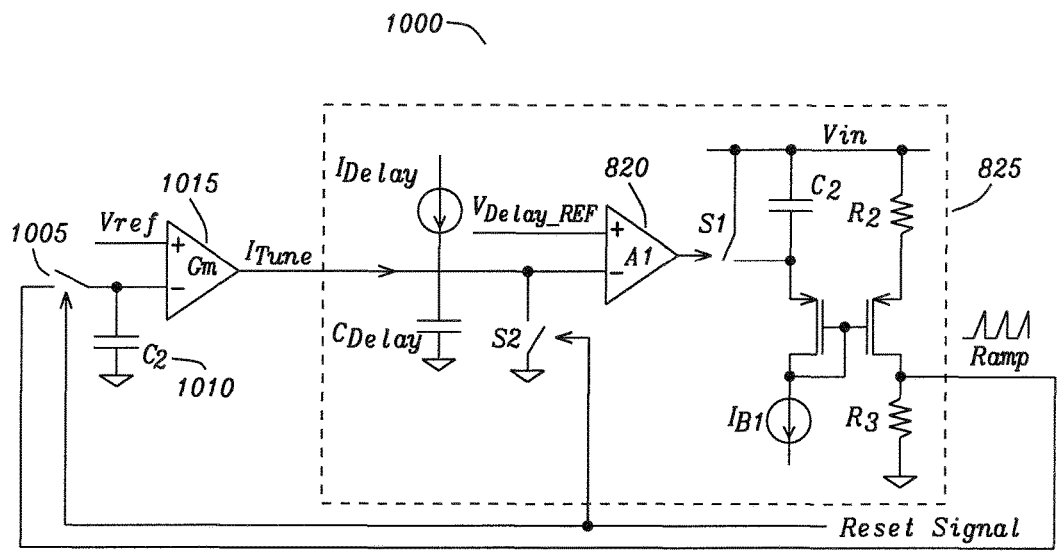
FIG. 10 is a diagram of another feedback loop for the switching converter of FIG. 3 based on an amplitude of a ramp signal.

FIG. 10 shows an alternative feedback circuit 1000. In this case the ramp generator 825 is connected to a sample and hold circuit. For example, the sample and hold circuit may be formed by a switch 1005, a capacitor 1010 having a first and a second terminal and an amplifier 1015. The amplifier 1015 has a first input for connecting to a reference voltage Vref and a second input for connecting to the first terminal of the capacitor 1010. The first terminal of the capacitor is connected to the switch 1005 and the second terminal of the capacitor is connected to a ground. The switch 1005 is adapted to receive a reset signal. The reset signal can be the output of the PWM comparator 130 in FIG. 3. In operation, the switch 1005 is closed when the reset signal is turned on. In this way the sample and hold circuit extracts the amplitude of the ramp signal.

Figure 11:
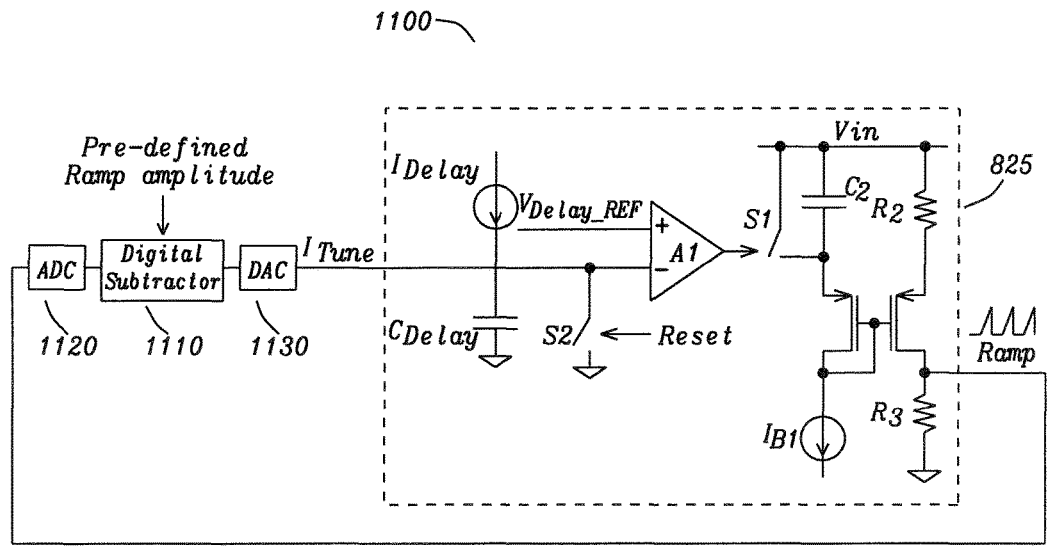
FIG. 11 is a diagram of yet another feedback loop for the switching converter of FIG. 3 based on an amplitude of a ramp signal.

FIG. 11 shows an alternative feedback circuit 1100. In this case the controller comprises a digital subtractor 1110 coupled to an ADC 1120 at an input side and to a DAC 1130 at an output side. The digital subtractor 1110 has a first input adapted to receive a predefine ramp amplitude, a second input adapted to receive a digital signal from the ADC 1120, and an output. In operation, the analog ramp signal is converted into a digital signal by the ADC 1120. The digital subtractor 1110 computes a difference between the ramp amplitude of the digitised ramp signal and a pre-defined ramp amplitude. The output of the digital subtractor 1110 is then sent to the DAC 1130 and converted into a control signal, in this example a current $I_{Tune}$.

Figure 12:
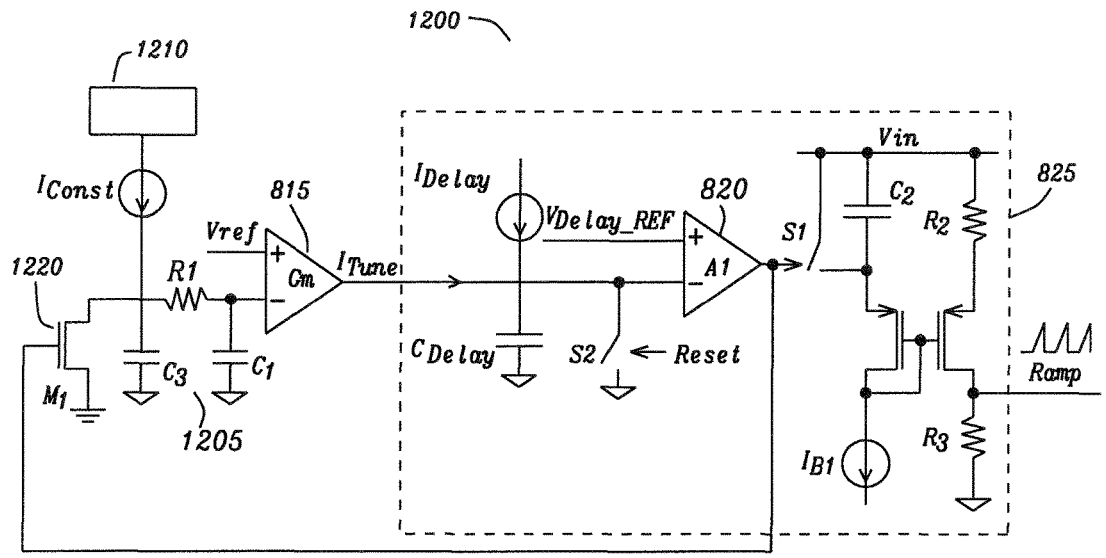
FIG. 12 is a diagram of a feedback loop for the switching converter of FIG. 3 based on an on-width of a ramp signal.

FIG. 12 shows another feedback circuit 1200 for adjusting a delay of the ramp signal based on an ON-width of the ramp signal. The feedback circuit includes a ramp generator 825 coupled to a ramp ON-width detector. The ramp generator may be identical to the ramp generator 825 described above. The ON-width detector may include a capacitor 1205 connected at a first terminal to a ground and at a second terminal to a current generator 1210 for generating a constant current Iconst. A switch 1220 is connected in parallel with the capacitor 1205 for controlling a charge and a discharge of the capacitor 1205. The switch 1220 may be a transistor having a gate adapted to receive a logic signal from the output of the comparator 820 of the ramp generator 825. An amplifier 815 includes a non-inverting input adapted to receive a reference voltage Vref and an inverting input connected to a low pass filter provided by a resistance R1 and a capacitor C1. The low pass filter is connected at the second terminal of the capacitor 1205. In an exemplary embodiment the amplifier 815 may be provided by an operational transconductance amplifier, such as a Gm cell.

In this case, the control signal Itune is generated based on an ON-width of the ramp. During a ramp ON-width duration, the switch M1 1220 is turned off (open). During this time, a constant current Iconst charges the capacitor C3 1205 to a given voltage value. During a ramp delay time, the switch M1 1220 turns on (closed). As a result, the capacitor C3 1205 discharges and the voltage VC3 across the capacitor reaches its minimum value. The amplifier 815 compares VC3 with the reference voltage and outputs the control signal Itune. Since both switches M1 and S1 are controlled by the same logic signal, the capacitor C2 of the ramp generator and the capacitor C3 charge and discharge at a same time.

Figure 13:
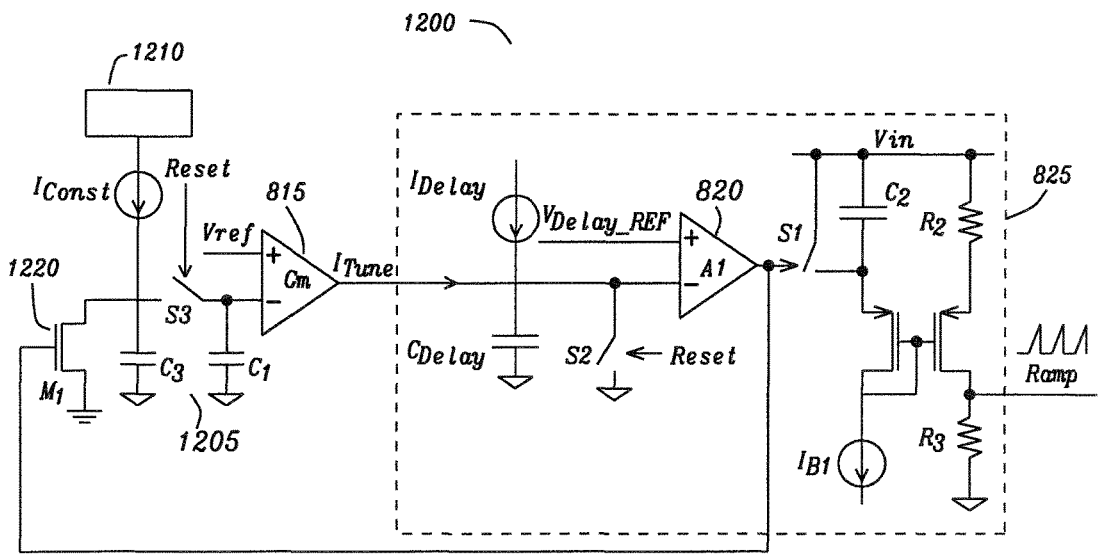
FIG. 13 is a diagram of another feedback loop for the switching converter of FIG. 3 based on an on-width of a ramp signal.

FIG. 13 shows another example of a feedback circuit 1300 for adjusting a delay of the ramp signal based on the ON-width of the ramp. Circuit 1300 is similar to 1200 except that R1 in 1200 is replaced by a switch S3. S3 and C1 form a sample and hold circuit that samples the voltage on C3 at the end of each ramp cycle. The end of each ramp cycle is determined by the Reset signal, which may come from the PWM comparator 130 of FIG. 3. The sampled voltage is proportional to the ON-width of the ramp signal, and is sent to a comparator 815 for generating a tuning current to change the delay of the ramp.

Figure 14:
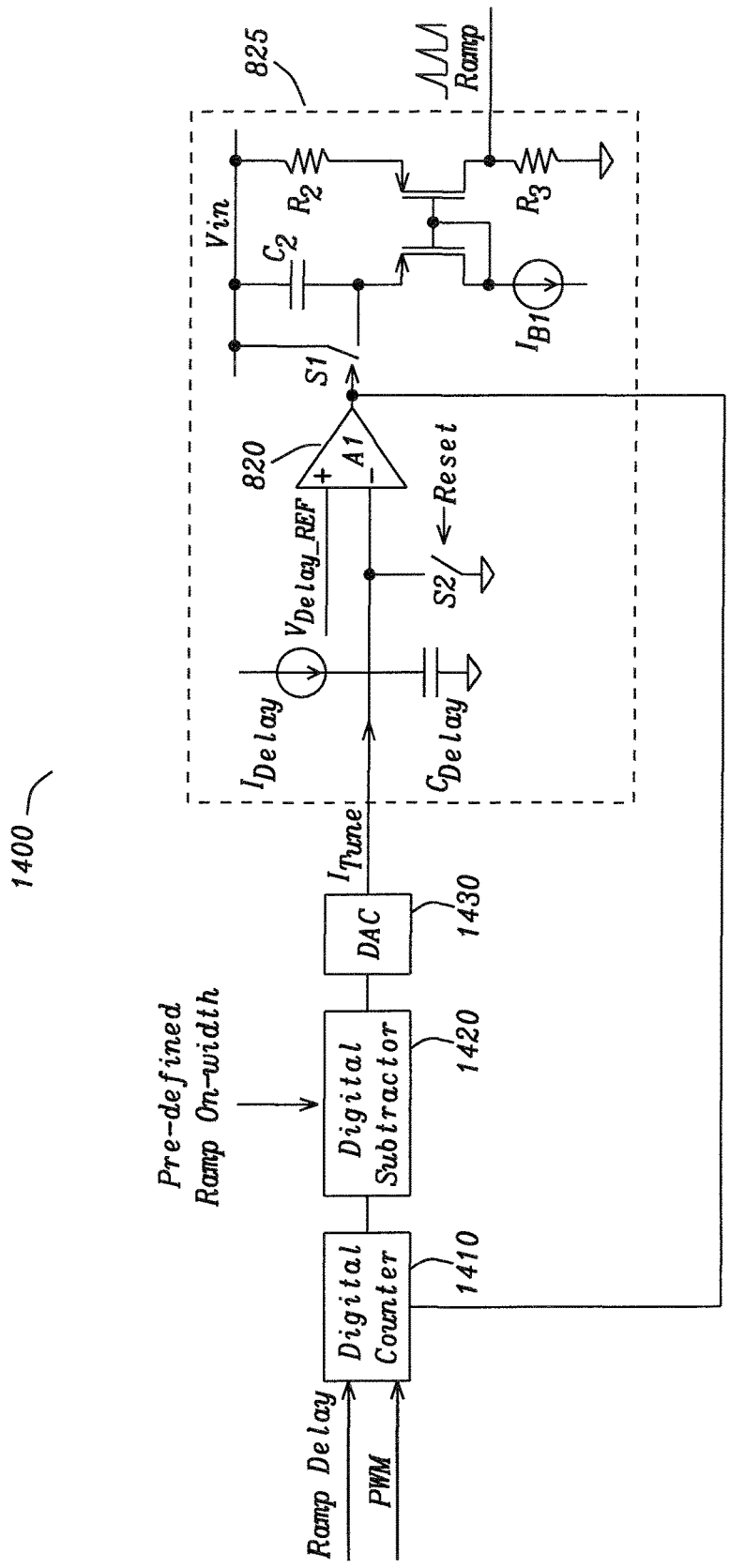
FIG. 14 is a diagram of yet another feedback loop for the switching converter of FIG. 3 based on an on-width of a ramp signal.

FIG. 14 shows another example of a feedback circuit for adjusting a delay of the ramp signal based on the ON-width of the ramp. In this case the ramp generator 825 is coupled to an ON-width detector comprising a digital subtractor 1420 and a digital counter 1410. The digital subtractor 1420 has an input coupled to the digital counter 1410 and at an output coupled to a DAC 1430. The digital counter 1410 has a first input for receiving the PWM signal generated by the comparator 130 of the switching converter 320, and a second input for receiving the logic signal generated by the comparator 820 of the ramp generator 825.

In operation, when the ramp delay of the ramp signal expires, the logic signal starts the digital counter 1410. This counting process stops when the PWM signal is triggered low. The value counted by the digital counter corresponds to the ON-width of the ramp. This counted value and a pre-defined ON-width code, are sent to the digital subtractor 1420. The digital subtractor 1420 computes a difference between a counted ramp ON-width and a pre-defined ramp ON-width. For example, one may use a 4-bit register to save the pre-defined ON width code. Assuming the code to be defined as 4'b1000; if the counted ON-width value is 4'b1010, then the subtracted value is 4'b0010. The output of the digital subtractor 1420 is then sent to the DAC 1430 and converted into a control signal, in this example a current $I_{Tune}$.

Figure 15:
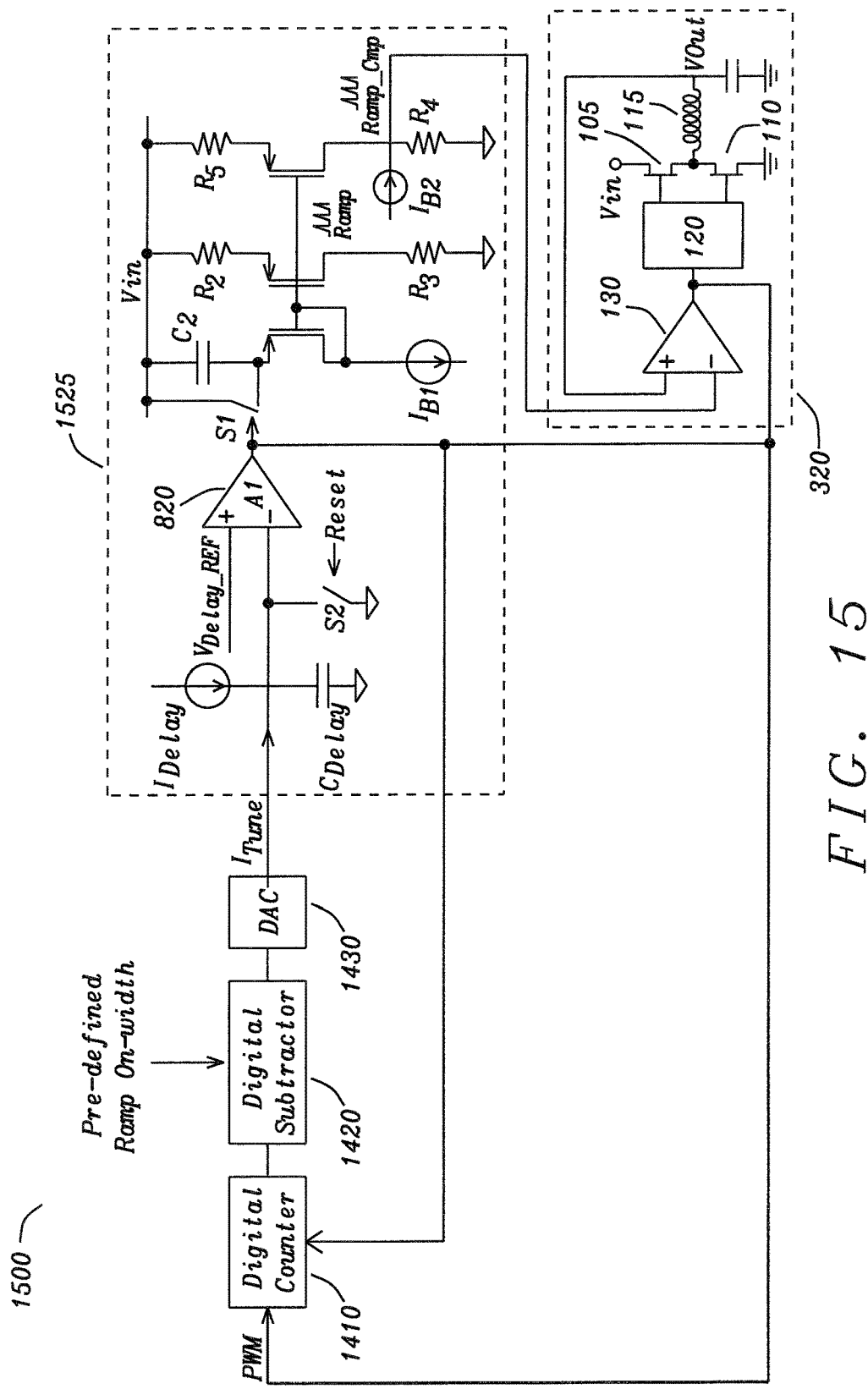
FIG. 15 is a diagram of a switching converter system including a feedback loop according to FIG. 14.

FIG. 15 shows a diagram of a switching converter system including the feedback loop of FIG. 14. The ramp generator 1525 is almost identical to the ramp generator 825. The output of the ramp generator has been modified to provide a ramp signal with a DC value, Ramp_Cmp, for comparison with the converter output voltage Vout. This is achieved by providing a third transistor coupled to the second transistor such that a gate of the third transistor is connected to a gate of the second transistor. A source of the third transistor is connected to a resistor R5. A drain of the third transistor is connected to a resistor R4. A current generator provided between the supply Vin and the drain of the third transistor generates a constant bias current IB2. The constant bias current IB2 determines the DC value of the Ramp_Cmp signal.

Alternatively, a DC value of the Ramp signal may be provided by including a current generator for generating a constant bias current between the supply Vin and the drain of the second transistor. In this case the third transistor and the resistors R4 and R5 are not required.

Such modifications of the ramp generator 825 may be used with any one of the feedback loops presented in FIGS. 8 to 14.

When the ramp delay is adjusted based on the amplitude of the ramp, the ramp may be passed directly to the ramp detector. Alternatively, a replica of the ramp is built and passed to the ramp detector. In both cases, this approach increases the capacitive load on the ramp generator. Considering the circuit of FIG. 8 as an example; when the ramp current I charges the resistor R3, it will also charge R1, C1, and the input capacitor of circuit 815. That is, the ramp voltage is no longer I*R3, but is I multiplied with a complex RC network. This may significantly change the response of the ramp signal and make the system fail. In contrast adjusting the ramp delay based on the ramp ON-width, adds no capacitive load to the ramp generator.

A skilled person will appreciate that variations of the disclosed arrangements are possible without departing from the disclosure. For example, a feedback circuit for adjusting a slope of a ramp signal may be combined with a feedback circuit for adjusting a delay of the ramp signal. Accordingly, the above description of the specific embodiment is made by way of example only and not for the purposes of limitation. It will be clear to the skilled person that minor modifications may be made without significant changes to the operation described.

What is claimed is:

1. A switching converter comprising
   a regulation circuit adapted to regulate an output value of the converter based on a ramp signal;
   a feedback circuit adapted to adjust a delay of the ramp signal based on a parameter of the ramp signal; and
   a ramp generator, the ramp generator comprising a delay circuit comprising a current generator coupled to a delay capacitor;
   wherein the feedback circuit comprises a controller adapted to output a tunable current based on the parameter of the ramp signal; the controller comprising a comparator adapted to compare the parameter associated with the ramp signal with a constant reference value and to output the tunable current based on the comparison;
   and wherein the delay circuit is adapted to receive the tunable current such that upon injection the tunable current changes a time required for charging the delay capacitor up to a voltage reference value.

2. The switching converter as claimed in claim 1, wherein the parameter of the ramp signal comprises an amplitude of the ramp signal.

3. The switching converter as claimed in claim 1, wherein the parameter of the ramp signal comprises a time duration during which the ramp signal is turned on.

4. The switching converter as claimed in claim 1, wherein the ramp generator comprises a capacitor circuit coupled to another comparator; wherein said another comparator is adapted to compare an output of the delay circuit with the voltage reference value; and wherein the capacitor circuit is adapted to receive an output of said another comparator.

5. The switching converter as claimed in claim 1, wherein the comparator comprises at least one of an operational amplifier and a digital subtractor coupled to a digital to analog converter.

6. The switching converter as claimed in claim 1, wherein the controller comprises a first circuit adapted to detect a time duration during which the ramp signal is turned on.

7. The switching converter as claimed in claim 6, wherein the first circuit comprises a current generator coupled to a capacitor and a switch connected in parallel with the capacitor; wherein the switch is adapted to receive a control signal.

8. The switching converter as claimed in claim 6, wherein the first circuit comprises a counter.

9. The switching converter as claimed in claim 1, wherein the controller comprises a second circuit adapted to detect an amplitude of the ramp signal.

10. The switching converter as claimed in claim 9, wherein the second circuit comprises at least one of a sample-and-hold circuit and a low-pass filter.

11. A method of regulating an output value of a switching converter comprising
generating a ramp signal with a ramp generator to regulate an output of the converter;
detecting a parameter associated with the ramp signal;
providing a feedback circuit coupled to the ramp generator, wherein the feedback circuit comprises a controller adapted to output a tunable current based on the parameter of the ramp signal; and
adjusting a delay of the ramp signal based on the parameter by comparing the parameter associated with the ramp signal with a constant reference value and generating the tunable current based on the comparison;
wherein the ramp generator comprising a delay circuit comprising a current generator coupled to a delay capacitor; and wherein the delay circuit is adapted to receive the tunable current such that upon injection the tunable current changes a time required for charging the delay capacitor up to a voltage reference value.

12. The method as claimed in claim 11, wherein the parameter associated with the ramp signal comprises at least one of an amplitude of the ramp and a time duration during which the ramp signal is turned on.

13. The method as claimed in claim 11, wherein the tunable current is adapted to increase the delay of the ramp signal upon identifying that the parameter of the ramp signal is greater than the constant reference value and to decrease a delay of the ramp signal upon identifying that the parameter is smaller than the constant reference value.

* * * * *